United States Patent

[11] 3,598,111

[72] Inventors Alan R. Kahn
    Cherry Hill;
    Warren L. Childs, Willingboro, both of, N.J.
[21] Appl. No. 782,220
[22] Filed Dec. 9, 1968
[45] Patented Aug. 10, 1971
[73] Assignee Health Technology Corporation

[54] TECHNIQUE AND APPARATUS FOR MEASURING AND MONITORING THE MECHANICAL IMPEDANCE OF BODY TISSUES AND ORGAN SYSTEMS
9 Claims, 10 Drawing Figs.
[52] U.S. Cl. .................................. 128/2.08, 73/67.1, 73/67.2
[51] Int. Cl. .................................. A61b 5/08, G01n 29/00
[50] Field of Search ........................ 73/67.1, 67.2, 69; 128/2, 2.08

[56] References Cited
UNITED STATES PATENTS
2,837,914 6/1958 Caldwell ...................... 73/67.1
3,410,264 11/1968 Frederik ...................... 128/2.08 X
3,440,867 4/1969 Prall et al. ................... 73/67.1

Primary Examiner—Channing L. Pace
Attorney—Woodcock, Washburn, Kurtz & Mackiewicz ABSTRACT: A technique and apparatus utilizing tuned mechanical and pneumatic principles for assessing the mechanical properties of body tissues and organ systems. The apparatus vibrates at a tuned frequency and is loaded by the specific tissue or organ system being assessed resulting in an impedance and a phase angle shift. From the above data, the resistive and reactive components of the measured impedance may be determined.

Fig. 1

INVENTORS
ALAN R. KAHN
WARREN L. CHILDS

OSCILLATOR

Fig. 9

SIGNAL AMPLIFIER & AMPLITUDE DETECTOR

Fig. 10

TECHNIQUE AND APPARATUS FOR MEASURING AND MONITORING THE MECHANICAL IMPEDANCE OF BODY TISSUES AND ORGAN SYSTEMS

BACKGROUND OF THE INVENTION

1. Field of the Invention

This invention relates to a new technique and apparatus for assessing mechanical properties of various body tissues and organ systems and more particularly to breathing apparatus for and the measurement of lung impedance.

In order to provide a basis for describing the principles and applicability of this method, it will be helpful to briefly describe the relevant physiological factors. The mechanical act of breathing begins as a result of the contraction of muscles of the diaphragm and chest wall which generate forces within the chest cavity which tend to change its volume. However, the viscosity of the lung tissues, the resistance of the air passages to the free flow of air, and the elasticity of the lung tissues and other structures of the chest all tend to prevent the forces developed by the muscles from changing the shape of the chest cavity. In fact, a certain amount of negative pressure must be developed within the chest before these impeding factors yield and permit the process of inhalation to take place.

The ability of the lungs to comply with the mechanical forces generated by the muscular contraction is termed "pulmonary compliance" and is expressed in terms of the pressures developed within the chest structures and the airflows which take place as a result. Pulmonary compliance is usually determined by performing two measurements simultaneously. One of these involves the insertion of a partially inflated balloon down the throat into the esophagus. The pressure within this balloon is coupled via an interconnecting tube to a pressure-measuring device and is a reflection of the pressure within the chest. The other measurement is that of the rate of the flow of air in and out of the respiratory system and is achieved by using a flowmeter attached to a face mask or other suitable breathing appliance. The potential of the lungs to comply to the forces of breathing can then be determined by interpretation of the results of these two measurements. Abnormally low compliance values result from decreased caliber of the air passages as seen in asthmatic conditions, from overinflation of the chest as seen in emphysema, from distention of the capillaries of the pulmonary circulation and the collection of edema fluid in the lung tissue as seen in certain kinds of heart failure and in episodes of excessive administration of intravenous fluid. From the compliance data, it is not usually possible to determine which of these factors is responsible for the problem.

2. Description of Prior Art

Quantitative evaluation of the performance of the breathing mechanism is important to the prevention, diagnosis, and therapy of a wide variety of disease states. Diseases of the lungs themselves such as emphysema, asthma, and chronic bronchitis cause mechanical changed which can potentially be measured. Since the pulmonary circulation is an intimate part of lung structure, certain diseases of the cardiovascular system are also reflected in changes in the mechanical properties of the lungs. In addition, when body tissues are caused to contain excessive quantities of water, fluid accumulations in the lung tissue cause mechanical changes which are especially dangerous and frequently cause death in acutely ill persons. This latter condition is called pulmonary edema.

Present art of performing measurements on the pulmonary system involves difficult and complicated procedures which demand considerably cooperation on the part of the patient and which yield nonspecific data from which diagnosis is difficult. Present methods are too complicated for applications in mass screening and too difficult to be used for continuous monitoring purposes. Since they require patient cooperation, they are not applicable to young children or to gravely ill patients who are comatose or under the effects of sedative medications or anesthetic agents. Probably the most useful data is presently derived from pulmonary compliance measurements which are dangerous to perform on acutely ill patients and on newborn children.

Present apparatus state of the art is represented by the Dynamic Pulmonary Resistance device manufactured by Lexington Instruments Corporation, Waltham, Mass. 02154. This device is described in the July 1968, edition of Medical Electronics News, page 3.

SUMMARY OF THE INVENTION

In accordance with this invention, a rapidly pulsating source of air is applied to the lungs via the upper respiratory tract. The source of this pulsating air is sensitive to the degree of restriction to the free flow of air caused by the pulmonary system of the patient who is attached. The apparatus is further able to resolve the nature of the impedance to airflow into its purely resistive components caused by restriction of the air passages or by tissue viscosity and its reactive component resulting from the stretching of elastic structures in the lung and chest walls. The method also includes the means for processing these data and presenting them in a format which is meaningful to clinical personnel.

The human respiratory tract appears to behave as a tuned pneumatic system. This is a result of several factors which influence the mechanical act of breathing. The flow of air into or out of the lungs is initiated by the development of a pressure gradient between the innermost portions of the lung tissues and the outside world. As a result of this pressure gradient, there is a tendency for air to flow into or out of the respiratory system. This flow of air is impeded by several factors. First of all, in order to accommodate airflow, the respiratory system must change its physical volume. This requires that the bones, muscles, and other tissues involved in respiration must change their relative positions. In doing so, a certain amount of friction is involved and some of the energy which is available as a result of the pressure gradient must be expended to overcome these frictional forces. This appears as a simple resistance to airflow. A second source of impedance results from the necessity to stretch certain elastic structures in order to change the shape of the lungs. These structures include elastic fibers in the lung tissues themselves, the muscles of the chest wall, and the linings of the upper respiratory tract. Energy absorbed in this manner is not dissipated, but is absorbed in these elastic structures on a temporary basis. For the sake of this discussion, we can call this type of impedance an elastic reactance. A third source of impedance to airflow results from the mass of air contained within the breathing pathways. When a fluid such as air is enclosed within a cylindrical tube, it exhibits inertia similar to any mass and tends to resist rapid changes of the position of the air within the tube. For the sake of this discussion, we will call this a mass reactance and note the fact that while this type of reactance also stores energy, it behaves in a manner opposite to the elastic reactance previously described. As a consequence, when contained within the same mechanical system, elastic reactance and mass reactance tend to cancel one another. Such a system is said to be "tuned" and if a sinusoidally varying pressure is applied to such a system, it is possible to select the frequency of the variation so that these two reactances exactly cancel one another and know that impedance is experienced. The respiratory tract of human patients comprises such a system of reactances and frictional resistance and appears to be resonant at a frequency of about 15 cycles per second when pressure is applied from an outside source. As a result, when a 15 cycle per second sinusoidal varying pressure is applied to the subject via a breathing appliance, a normal human patient will exhibit only the frictional resistance previously described and the flow resulting from the varying pressure will appear to be closely in phase with the driving pressure. However, if mechanical changes are produced within the lungs as a result of a disease process, this delicate balance is disturbed and a greater portion of the applied energy is stored in the stretching of elastic structures. As a result, the respiratory system is no longer "tuned" to the driving frequency and a phase shift develops between the sinusoidal pressure and the resulting sinusoidal airflow.

Accordingly, it is an object of the present invention to provide a new technique and apparatus for assessing mechanical properties of various body tissues and organ systems which can be performed simply and rapidly, which does not require cooperation on the part of the patient, which, can be used continuously for monitoring purposes, and which provides precise data that can be more directly related to specific disease processes.

It is another object of the present invention to provide a method for conveniently measuring the mechanical properties of the lungs and associated breathing apparatus for use in screening patients in order to detect illness, in diagnosing the specific problem, in monitoring acutely ill patients, and in following the progress of therapy.

DESCRIPTION OF A PARTICULAR EMBODIMENT

Figure 1:
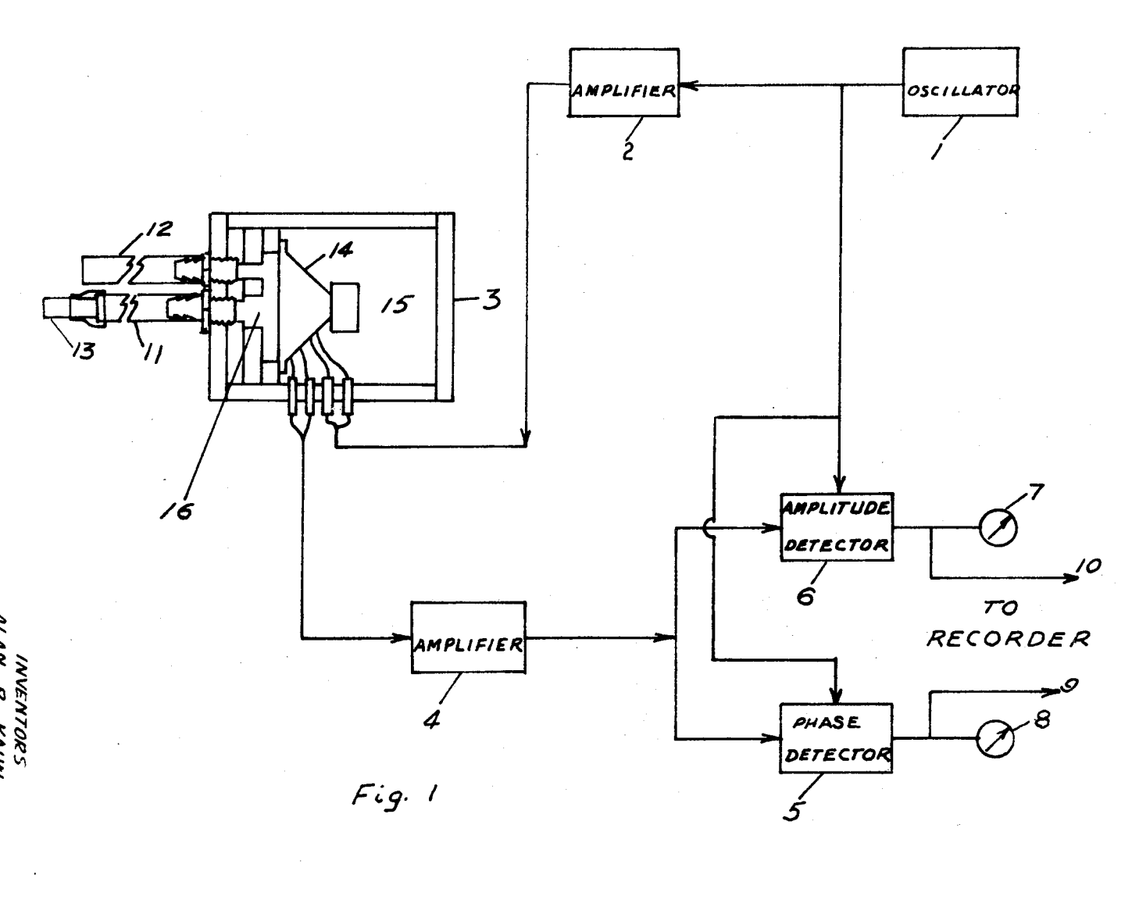
FIG. 1 represents a specific embodiment of the apparatus of the present invention.

FIG. 1 illustrates a block diagram of the apparatus we have constructed to establish the feasibility and practicality of this invention. Using FIG. 1 for reference, the air driver, which is the source of pulsating air, is the most important and unique component of the system. Its construction and performance will be described later in this disclosure. In general, the system functions by providing a constant amount of sinusoidally alternating electrical power to the air driver unit. The air driver unit is thereby caused to provide a sinusoidally varying flow of air into and out of the patient via the breathing tube and breathing appliance. The quantity of air actually moved by the air driver is dependent upon the degree of restriction or impedance provided by the respiratory system of the patient. The degree of attenuation of the mechanical motion of the air driver by the patient is then detected, amplified, and analyzed by the remaining circuitry.

More specifically, again relating to FIG. 1, the oscillator circuitry 1 generates an alternating voltage varying at a rate of 15 cycles per second. This frequency is not critical and signals from 5 cycles per second to 50 cycles per second have been utilized in our experiments. This signal is then amplified by a power amplifier 2 to a power level which is capable of sufficiently activating the air driver unit. The air driver unit 3 then converts the electrical energy to mechanical motion which is used to drive a small quantity of air into and out of the patient.

The actual extend of mechanical motion occurring within the air driver unit depends upon the "loading" by the patient, a factor which tends to attenuate and affect the timing of the oscillatory motions within the air driver unit. These motions are detected by a motion sensor device within the air driver and converted to analogous electrical signals which describe that motion. These are amplified by a signal amplifier 4 and applied simultaneously to two separate detector devices which analyze the signal. The first of these is an amplitude detector 6 which determines the overall size of the electrical signal and thereby can provide information describing the overall impedance of the patient to the flow of air from the driver unit. The second detector, the phase detector 5, determines the extent to which the attachment of the patient has caused the electrical signal detected by the signal amplifier to vary in phase, or "be out of step" with the electrical energy from the power amplifier which drives the air driver unit. In order to perform this function, the phase detector must simultaneously be provided with an electrical signal from either the oscillator 1 or power amplifier 2 in order to make the timed comparison. In the circuitry we have chosen to employ, the amplitude detector 6 also makes use of this timed information in order to respond more rapidly to changes in the patient's condition. Phase and amplitude information are then displayed on electrical meters 7 and 8 and simultaneously the electrical signals which describe the phase and amplitude information 9 and 10 are available to be applied to any of a variety of recording systems. The mechanical reactive and resistive properties of the patient's respiratory system at any moment in time can then be calculated from the amplitude and phase information derived at that moment.

Figure 2:
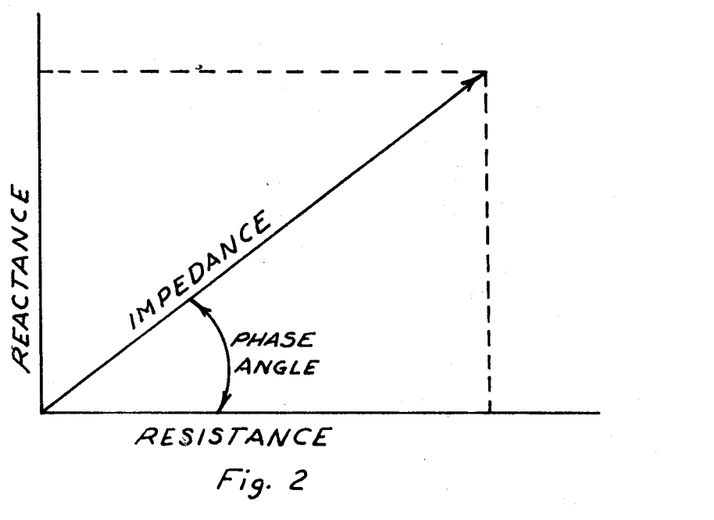
FIG. 2 shows an impedance plot from which resistance and reactance may be determined.

FIG. 2 illustrates one manner in which the data on a given patient can be presented and examined. Any single point on this graph represents an impedance value. Its direct distance to the origin of the graph represents the total or resultant impedance and the angle by which this line deviates from the horizontal indicates the phase angle. Therefore, by knowing the impedance length and phase angle it is possible to plot the impedance point. The reactance and resistance values can then be determined by projecting this point to the horizontal and vertical axes of the graph.

Figure 3:
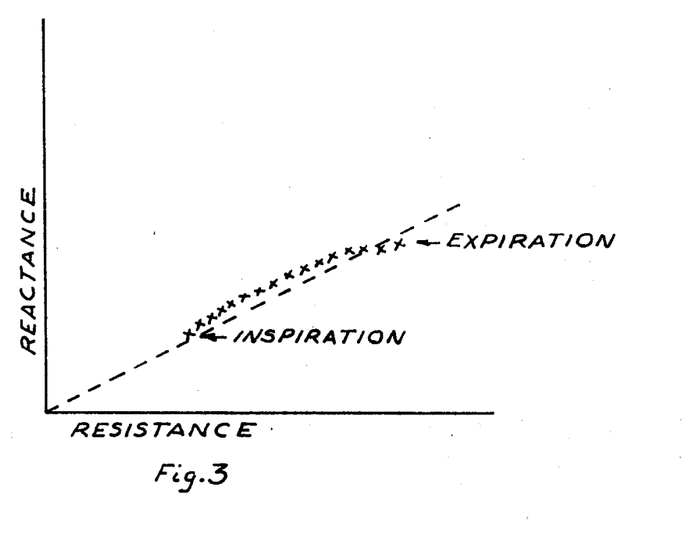
FIGS. 3 and 4 show records plotted from data taken by the apparatus of the present invention.

However, the impedance of the respiratory system in a given patient is not constant but varies as the patient breathes. FIG. 3 shows a locus of impedance points traversed by a patient through a single respiration cycle. The graph indicates that the impedance increases as the patient exhales and decreases as the patient inhales. The dashed line illustrates the fact that, in this case, the phase angle did not significantly change during the respiratory cycle and only the amplitude varied. This is typical for a normal patient. The resistance to the flow of air into and out of the lungs is primarily generated by the viscosity of the tissues and represents frictional losses of energy. The reactance is caused by the elastic structures within the chest and lungs and its value is a measure of the amount of energy used to stretch these elastic structures. FIG. 3 illustrates a normal respiration where the phase angle remains small and constant during the entire respiratory cycle.

Figure 4:
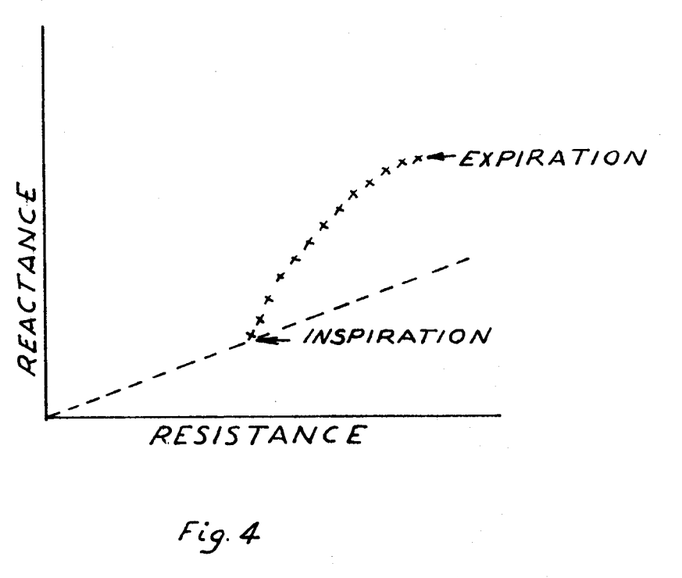

FIG. 4 illustrates an actual case we observed where the phase angle changed markedly during the respiratory cycle and was relatively high in the first place. This patient appears to be normal at the inspiration phase of breathing, but the phase angle rises markedly above the normal value as the patient exhales. This is the expected curve for a patient with asthma.

Plotting these curves and producing these graphs by hand is a tedious process and it is oftentimes desirable to automatically record and display this information. Commercially available recording systems do not operate in a manner which allows the direct plotting of phase angle and, therefore, cannot produce these graphs using the data from the amplitude and phase detectors.

Figure 5:
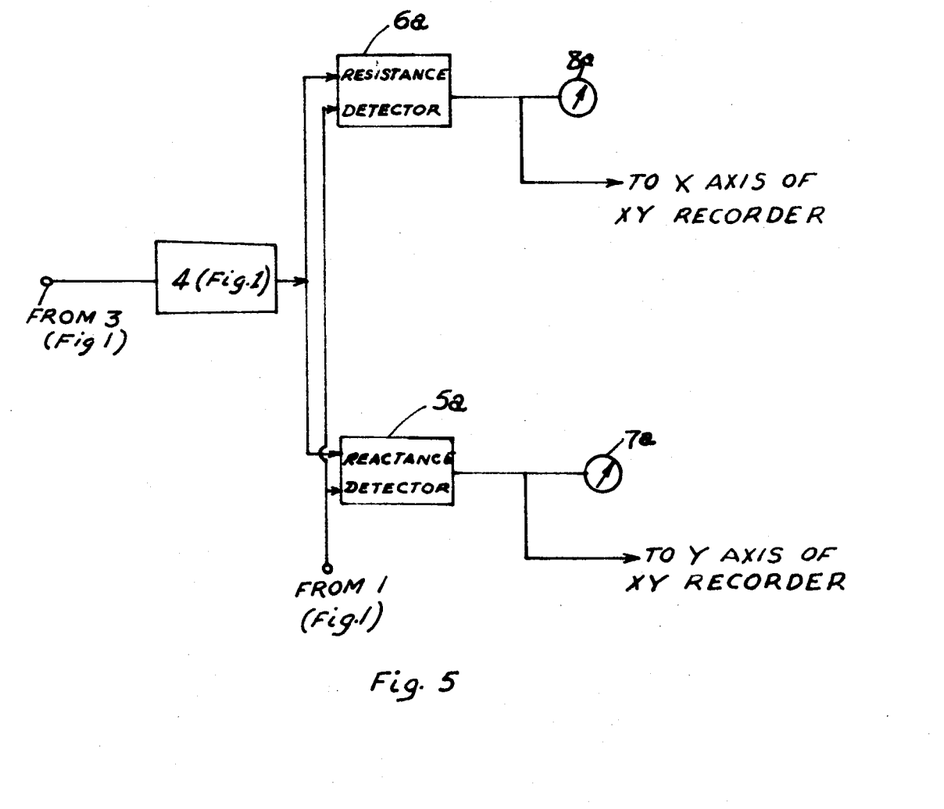
FIG. 5 represents an alternate embodiment of the apparatus of the present invention.

FIG. 5 illustrates a second embodiment utilizing a revised signal processing circuitry where the detectors 5a and 6a determine the resistance and the reactance directly. As before, these detectors also require simultaneous information from the oscillator 1 or power amplifier 2. The voltages on the output of these detectors simultaneously provide resistance and reactance data which are adequate to determine the impedance of the patient's respiratory system at any moment in time.

By applying the voltage from the resistance detector 5a to the circuitry which displaces a conventional XY recorder horizontally and the signals from the reactance detector 6a to the circuitry which displaces the recorder vertically, the impedance graph can be plotted automatically as the patient breathes. In order to generate such a graph, it is only necessary to apply the breathing appliance to the patient's face, activate the recorder, and allow it to record for the duration of a single breath. The recorder can then be turned off and the graph is complete.

Again referring to FIG. 1, the construction of the air driver unit 3 we have utilized is illustrated. Externally, this unit appears to be a closed wooden box with two flexible polyvinyl chloride tubes 11 and 12 emerging from one of its faces. A breathing appliance 13 is attached to the end of one of the flexible tubes 11. Within the box is mounted a special audio speaker 14. One Commercially available speaker which is suitable for use is University Sound Model C 8HC. The special features of this speaker are:

1. It is designed to operate efficiently at very low frequencies. 2. It has two identical voice coils which are not electrically connected to each other, but are mounted on the same speaker cone. 3. These voice coils are wound so that they are long coils and overlap the magnet structures on both ends. They thereby provide linear response over wide excursions of the speaker cone.

One of the speaker coils is connected to the output of the power amplifier 2 and is used to drive the speaker cone mechanically. The other coil is used to detect the signal voltage describing the actual motion of the speaker cone. This coil is caused to move in the magnetic field by the motion of the speaker and thereby generates electrical signals proportional to the velocity of the motion.

The speaker 14 is mounted within the box in such a way that it is interposed between air chambers 15 and 16. The rear chamber 15 is relatively large and totally enclosed on five sides by wooden walls and on the sixth side by the rear surface of the speaker 14. In order for the speaker cone to move it must compress and expand the air in this rear chamber 15. The front chamber 16 is more complicated and is formed by a series of laminated wooden panels with progressively smaller holes cut out of their centers. When assembled, these panels provide a space which gradually becomes smaller in a stepwise fashion as the distance from the front of the speaker cone increases. This space funnels down to an exit port into which is inserted a nipple which attaches to the breathing tube 11 on the outside. There is also a second exit port on the same surface eccentrically placed into which is inserted another nipple which is attached to the side tube 12 on the outside of the box.

In order that this system be capable of measuring reactance as well as resistance, it is essential that the system itself exhibit no phase shift. In order words, the system must be mechanically tuned so that its mechanical resonance is at the same frequency as the oscillator 1 voltage output. Under these conditions, the voltage applied to the driver unit 3 by the power amplifier 2 will be in phase with the actual motion of the speaker cone which will, in turn, be in phase with the flow of air out of the breathing appliance 13 which will, in turn, be in phase with the electrical signal detected by the signal amplifier 4. Under these conditions, the reactance of the system, without the patient attached, will be zero and the small impedance that will be measured will be caused by the resistance to the flow of air in the tubing. A complicating feature in the design is caused by the fact that the patient must be free to breathe into the system while it is performing a measurement upon him. This is the reason for the side tube 12 on the equipment.

In theory, it would be ideal if the system would pump air back and forth freely when the breathing appliance 13 is exposed to the room atmosphere and would undergo no excursion at all when the breathing appliance 13 is completely occluded, so that no air can flow through the breathing tube 11. Because of the necessity for a side tube 12, the ideal condition can only be approximated and requires that the system be tuned for a null as well as for a maximum output condition. The air within the two chambers 15 and 16 is compressible and acts as a reactance which causes the speaker excursion to lead the applied voltage from the power amplifier 2 when it is driven in a sinusoidal manner. The air within the breathing tube 11 and side tube 12 is confined and has finite mass. When a sinusoidal pulsation is applied, the inertia of the air in these tubes results in a reactance which causes the motion of the speaker cone 14 to lag behind the driving current from the power amplifier 2. The tuning process involves the selection of chamber sizes and tube lengths so that these effects exactly balance one another and the net reactance is zero. In order to select the proper dimensions in the design of a specific driver unit 3, it is advisable to perform the tuning experimentally in two steps. First, the opening into the breathing appliance 13 is firmly blocked with a cork or rubber stopper. Under these circumstances, it is desirable that the speaker 14 move a minimum amount and that the smallest possible electrical signal be obtained from the sensing coil. Under these conditions, the frequency in which the speaker motion is minimum depends upon the size of the air space in the front chamber 16 and the lengths and diameter of the side tube 12. Once as oscillator frequency is selected and the design of the box containing the speaker has been selected, the null can be achieved by selecting the length of side tube 12 which provides a minimum signal at that frequency. Step 2 involves removal of the obstruction from the breathing tube 11 and adjustment of the length of the breathing tube 11 so that a maximum response is obtained. The tuning for maximum response depends upon the size of the rear chamber 15, the length of the breathing tube 11, and the length of the side tube 12. When the system is properly tuned, the driving voltage is in phase with the signal voltage when the breathing appliance 13 is occluded and when the breathing appliance 13 is open to room air. Under these conditions, partial obstruction of the breathing appliance 13 will cause the electrical signal describing the speaker motion to attain a value somewhere between the open and closed position and will also exhibit no phase shift. Such a partial obstruction is resistive in nature. When the system has been tuned in this manner, its sensitivity to external loading by the respiratory system is maximum and phase shifts can only be produced by external reactances such as those exhibited by the respiratory apparatus of the patients under test.

Figure 6:
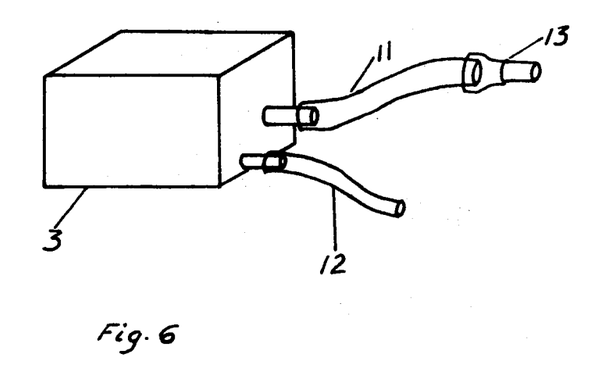
FIGS. 6 and 7 represent alternate embodiments of the air driver unit of the present invention.

In order to produce maximum transmission of air pulsations through the breathing tube 11, it is important that there be no large sudden changes in the diameter of the air pathway. It is for this reason that the front chamber 16 is formed in the shape of a cone by the laminated layers of wood. FIG. 6 illustrates an external view of the air driver unit 3 just described.

Figure 7:
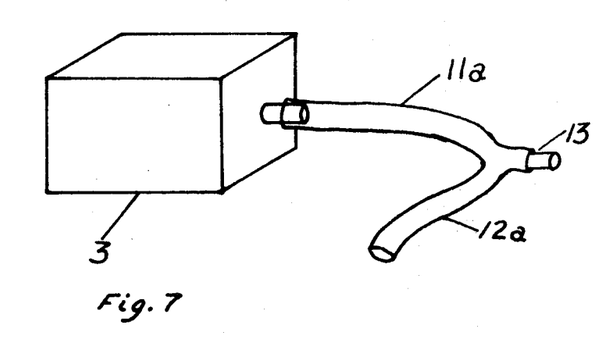

FIG. 7 illustrates an alternative configuration where the side tube is an extension of the breathing tube. While the configuration in FIG. 7 is feasible and has been shown experimentally to perform in a similar manner, it is less desirable since the resistance of the tubes plays a greater role and the sensitivity of the system is thereby decreased.

Particular circuits which are suitable for use in accordance with the FIG. 1 embodiment of the invention will now be described.

Figure 8:
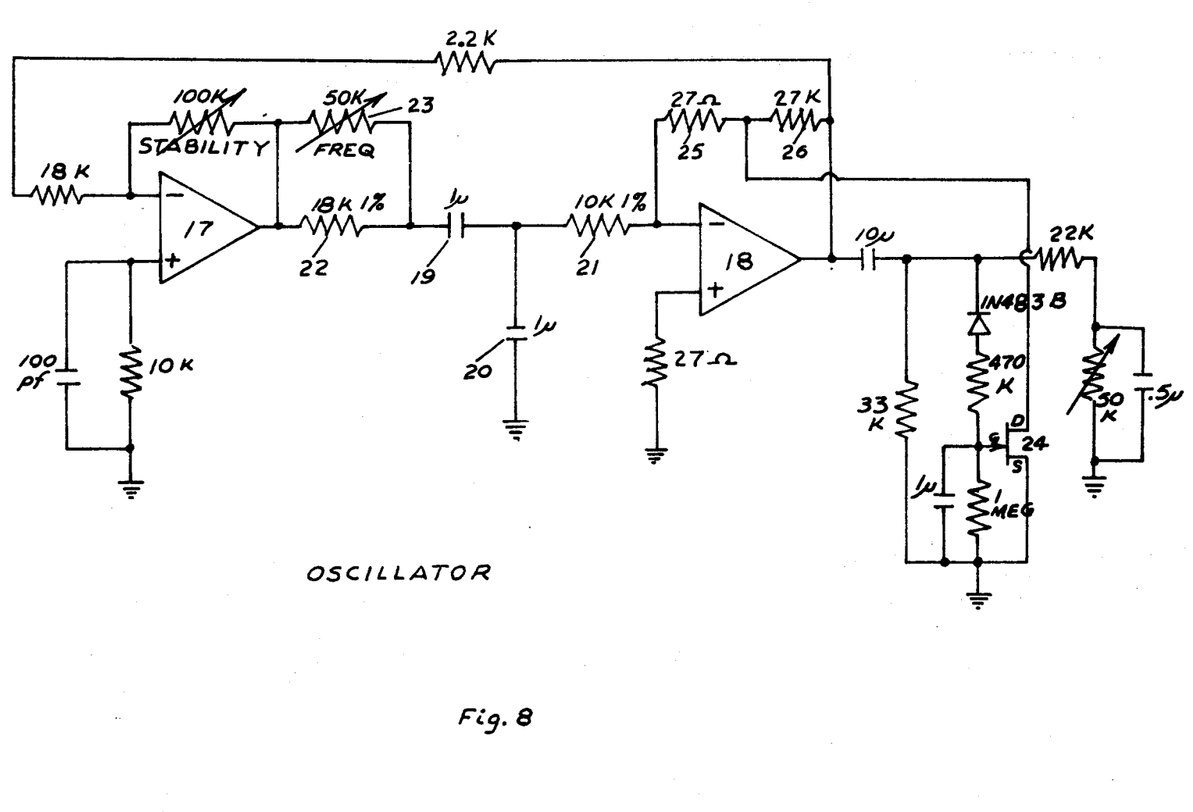
FIG. 8 shows the oscillator circuit used in the embodiments described in FIGS. 1 and 5.

FIG. 8 shows an oscillator circuit which produces a highly stable 15 cycle per second signal with very low-distortion. High-stability and low-distortion are rigorous requirements of the system because any slight deviation from the frequency to which the air driver is tuned will interfere with the detection of the phase difference. FIG. 8 shows an oscillator in which amplifiers 17 and 18 are connected in a feedback loop.

The tuning is determined by capacitors 19 and 20 and resistors 21, 22 and 23. While these components make up a low Q circuit, their inclusion in circuit with the two amplifiers results in a Q multiplication thereby providing a very stable frequency.

As a unique feature of this circuit, an FET (field effect transistor) 24 is interposed in the feedback loop controlling the gain of amplifier 18. Specifically, the FET 24 is connected to the junction of resistors 25 and 26 which are in the feedback path of the amplifier 18. The FET 24 presents a variable impedance depending upon the output signal of the amplifier 18. This arrangement causes the amplifier to produce a signal which is consistent with the low distortion requirements imposed by the system.

The critical circuit parameters are given below:

| | |
|---|---|
| resistor 23 | 50K |
| resistor 22 | 18K |
| resistor 21 | 10K |
| capacitors 19 and 20 | 1µf |
| resistor 25 | 27 ohms |
| resistor 26 | 27K |
| amplifiers 17 and 18 | Analog Device Model 111 |
| FET 24 | 2N4856 |

In an actual embodiment of the invention, power amplifier 2 is a one watt power amplifier of conventional configuration.

Figure 9:
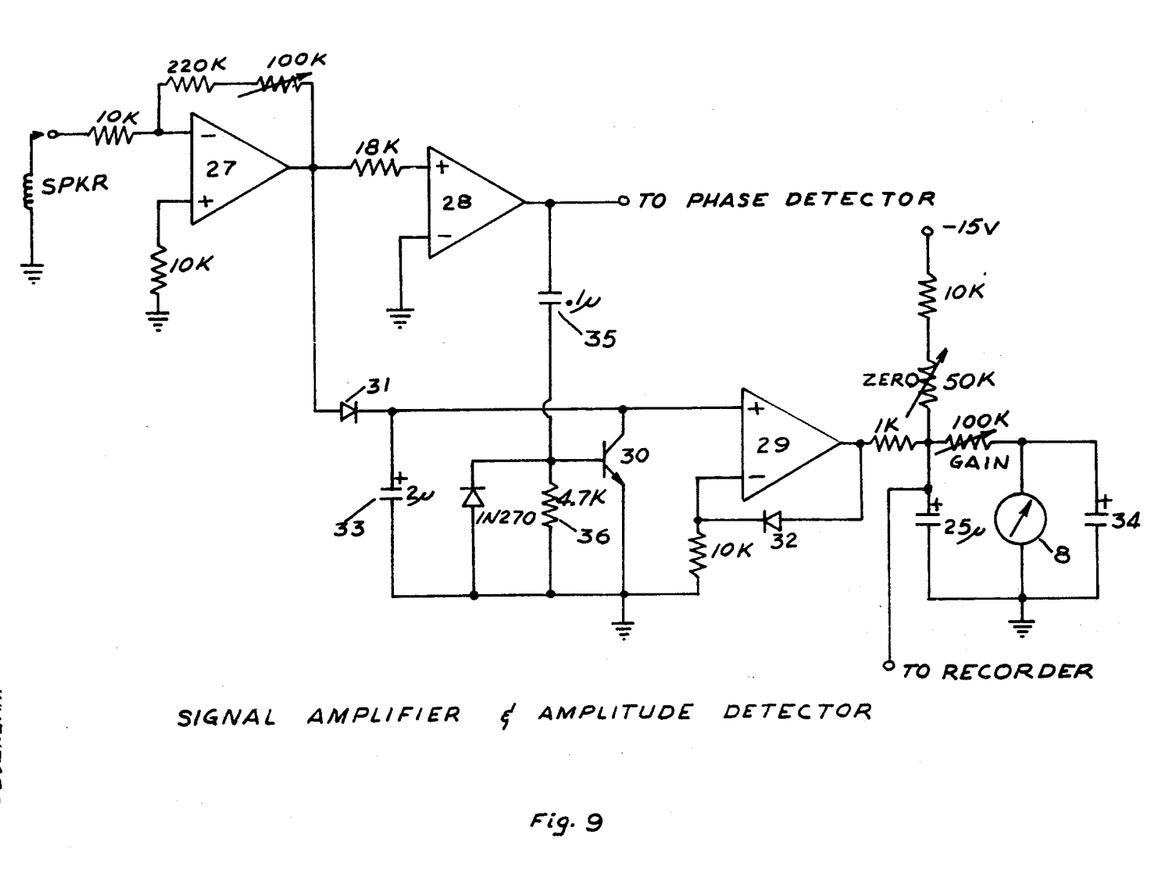
FIG. 9 shows the signal amplifier and amplitude detector circuitry used in the embodiment described in FIG. 1.

Referring to FIG. 9, there is shown the circuitry for the signal amplifier 4 and amplitude detector 5 of FIG. 1.

FIG. 9 shows a signal amplifier 27 of conventional design which provides a variable gain of between 20 and 30 times. The output of the signal amplifier 27 is simultaneously fed to the input of amplifier 28 and through diode 31 to the input of amplifier 29. Amplifier 28 is operated open loop. The amplified signal from amplifier 27 is of sufficient size to cause amplifier 28 to be driven from saturation to cutoff giving a square wave output signal with an amplitude of ±13v. This square wave output of amplifier 28 is maintained whether the breathing appliance is open or completely occluded allowing a constant amplitude signal to be provided to the input of the phase detector 6.

The output of the signal amplifier 27, in addition to being supplied to amplifier 28 is rectified by diode 31, charges capacitor 33, and is read as a DC voltage by amplifier 29.

As a unique feature of this circuit, the output of amplifier 28 is differentiated through capacitor 35 and resistor 36. The differentiated signal is then fed to the base of transistor 30 causing it to be turned on once each cycle for the duration of the differentiated output of amplifier 28. During the time transistor 30 is turned on, capacitor 33 is discharged through transistor 30. After transistor 30 returns to its nonconducting (turned off) state, capacitor 33 charges to a new value. This allows the output of amplifier 29 to maintain a one cycle response time to changes in signal amplitude from amplifier 27. Diode 32 is in the feedback loop of amplifier 29 and changes the gain of amplifier 29 to compensate for the forward conducting characteristics of diode 31, therefore, maintaining a linear response at the output of amplifier 29. The output of amplifier 29 is supplied to meter 8. Capacitor 34 is selected for the desired damping of the response of meter 8.

The critical circuit parameters are given below:

| | |
|---|---|
| amplifiers 27, 28 and 29 | Analog Devices Model 111 |
| transistor 30 | 2N 3646 |
| diodes 31 and 32 | IN270 |
| capacitor 33 | 2 µf |
| capacitor 34 | selected for desired meter response |
| capacitor 35 | 0.1 µf |
| resistor 36 | 4.7K |

Figure 10:
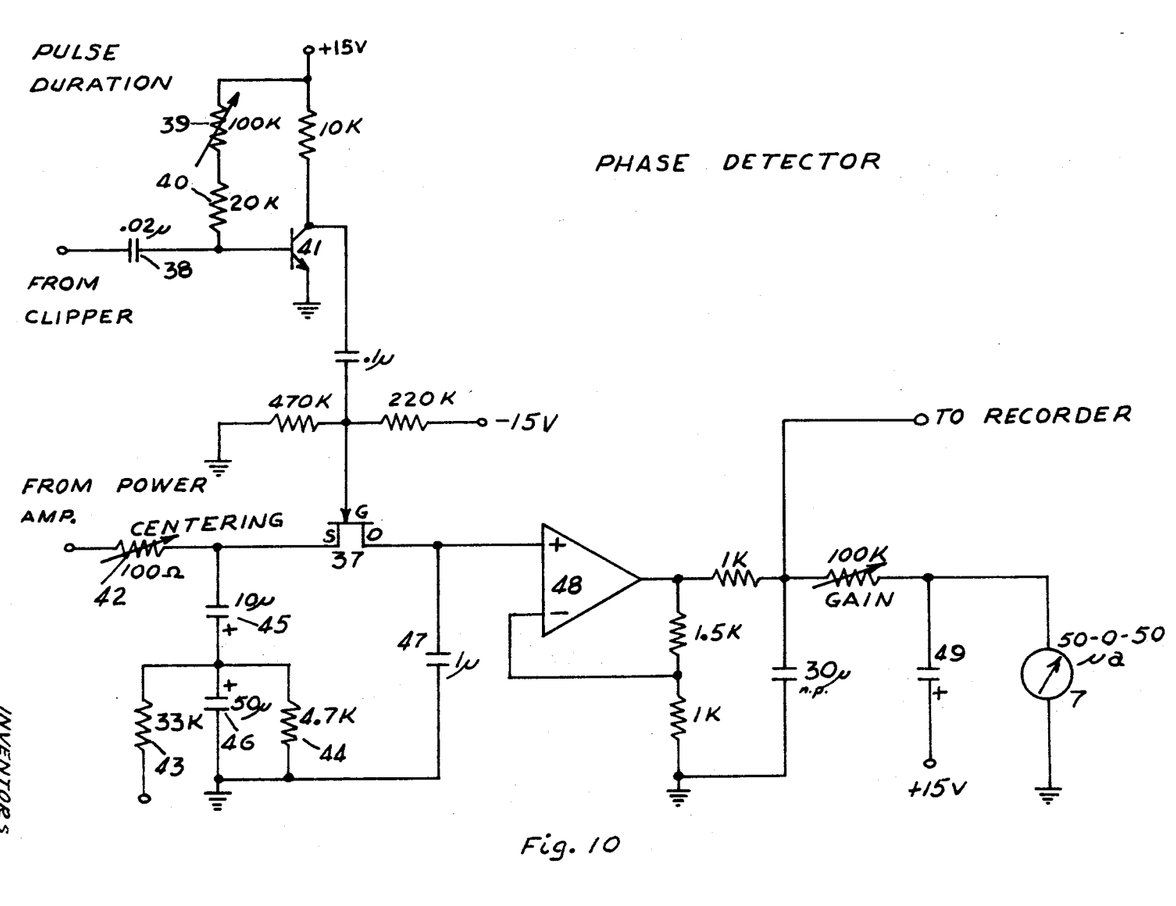
FIG. 10 shows the phase detector circuit used in the embodiment described in FIG. 1.

Referring to FIG. 10, there is shown the circuitry for the phase detector 6 of FIG. 1.

Simultaneous signals are fed to FET (field effect transistor) 37 from the clipper (amplifier 28 FIG. 9) and from the power amplifier 2 FIG. 1. The square wave signal from the clipper is processed by capacitor 38, resistors 39 and 40, and transistor 41 to achieve a pulse with a duration of 1 millisecond at the collector of transistor 41. This 1 millisecond pulse is fed to the gate connection of FET 37 causing it to conduct during the pulse duration. The 2v. peak to peak sinusoidally varying wave from the power amplifier is fed to the source connection of the FET 37 through a phase shifting network comprised of potentiometer 42, resistors 43 and 44, and capacitors 45 and 46. During the time FET 37 is conducting, a charge builds up on capacitor 47 resulting in an input signal to amplifier 48 which is proportional to the phase difference between the two input signals. Potentiometer 42 is adjusted to give a zero reading on meter 7 when the two input signals are in phase.

Capacitor 49 is selected to give the desired response of meter 7.

The critical circuit parameters are given below:

| | |
|---|---|
| (field effect transistor)FET 37 | 2 N 4856 |
| capacitor 38 | 0.02 µf |
| potentiometer 39 | 100K |
| resistor 40 | 20K |
| transistor 41 | 2N3646 |
| potentiometer 42 | 100 ohms |
| resistor 43 | 33K |
| resistor 44 | 4.7K |
| capacitor 45 | 10 µf |
| capacitor 46 | 50 µf |
| capacitor 47 | 1 µf |
| amplifier 48 | Analog Devices Model 111 |
| capacitor 49 | selected for desired meter response |

The particular combination of the electronic subsystem modules, previously described and illustrated in FIGS. 1, 5, 8, 9 and 10 may have unique features. However, the most important and unique component of the system is the air driver unit 3. The particular design which was described previously is simply one of many possible designs which allow for tuning the mechanical system in such a way that it exhibits no reactance until it is applied to a load which has reactive components. It is important that the driver unit itself have an impedance which is relatively well-matched to the impedance of the type of tissue being measured, in this case the lungs and chest walls. The technique just described has general applicability to the measurement of the viscous and elastic properties of many body tissues. Similar electronic modules attached to a mechanical driver unit which is also tuned for zero reactance can be used to measure the viscoelastic properties of muscles. The purpose of using a mechanical driver unit rather than an air driver unit is to better match the higher impedance of the muscle tissue. The measurement of the viscoelastic properties of various muscle groups is important in research and in evaluation in the practice of rehabilitation medicine. It is anticipated that other tissues can also be measured using these techniques to provide useful information.

In practice, we have found the phase angle to provide the most important clinical information. The total impedance, as well as the resistance, can vary markedly during the respiratory cycle, can vary markedly from patient to patient, and does not seem to be significantly changed under circumstances where lung disease is present. However, the phase angle which reflects the efficiency of the breathing process, is markedly affected by disease. Therefore, the significant design feature of this system is the fact that it is tuned and the significant performance features are that it can detect reactance and resistance which allow for a complete description of the impedance and an enhanced diagnostic capability.

We claim:

1. The method of measuring the mechanical reactance and resistance of body tissues comprising:
mechanically driving said tissues with a force which varies repetitively at a frequency within the range of 5 to 50 cycles per second the resonant frequency of the tissue structure,
detecting the resultant motion of said body tissues, and comparing said resultant motion with said force to determine the amplitude difference between the two as a measure of the resistive properties of said tissues, and comparing said resultant motion with said force to determine the phase difference between the two as a measure of the reactive properties of said tissues.

2. The method of measuring the mechanical reactance and resistance of the lungs of a patient comprising:

supplying pulsating air, with a force which varies at a frequency within the range of 5 to 50 cycles per second, to a breathing appliance coupled to the patient's respiratory system, measuring the movement of air to and from said breathing appliance, detecting the amplitude of said movement relative to said force at which said pulsating air is supplied to said breathing appliance, said amplitude being a measure of the resistive properties of the lungs, and detecting the phase difference of said movement relative to said force at which said pulsating air is applied to said breathing appliance, said phase difference being a measurement of the reactive properties of the lungs.

3. Apparatus for the measurement of the resistance and reactance of the lungs comprising:

an air driver unit producing an oscillating source of air in response to energization thereof, an oscillator energizing said air driver unit at a frequency within the range of 5 to 50 cycles per second, a breathing appliance pneumatically coupled to said air driver unit, said air driver unit being mechanically tuned to the frequency of said oscillator so that the motion of the air in the breathing appliance is in phase with the force applied by said air driver when the breathing appliance is occluded and when the breathing appliance is open, a first transducer for producing a first electrical signal representing the force applied to the air in said breathing appliance, a second transducer producing a second electrical signal representing the actual motion of the air in said breathing appliance, measuring circuitry responsive to said first and second electrical signals for producing an output representing the amplitude of said movement relative to said force, and measuring circuitry responsive to said first and second electrical signals for producing an output representative of the phase difference between said first and second electrical signals, said outputs together providing an impedance profile of the lungs.

4. The apparatus recited in claim 3 further comprising:

a side tube pneumatically coupling said air driver and said breathing appliance to the atmosphere so that normal breathing can be accomplished through said breathing appliance.

5. Apparatus for the measurement of the resistance and reactance of the lungs comprising:

an air driver including a diaphragm, a first coil for driving said diaphragm in an oscillating motion in response to an electrical signal applied thereto, an oscillator for driving said first coil at a frequency within the range of 5 to 50 cycles per second, a breathing appliance pneumatically coupled to a chamber on one side of said diaphragm, a second coil mounted on said diaphragm and producing an electrical signal representing the actual motion of said diaphragm, a phase detector for comparing the signal applied to said first coil with the signal appearing on said second coil to determine the relative phase between said two signals, and an amplitude detector, said signal representing the actual motion of said diaphragm being applied to said amplitude detector to produce an output representing the magnitude of the impedance of the lungs.

6. The apparatus recited in claim 5 further comprising a recorder for displaying the output of said phase detector relative to the output of said amplitude detector to display the total impedance profile of the lungs.

7. The apparatus recited in claim 5 wherein said air driver includes an enclosure, said diaphragm being mounted in said enclosure to divide it into two chambers, said breathing appliance being pneumatically coupled to one of said chambers, said air driver being mechanically tuned to the given frequency of said oscillator so that the motion of the diaphragm is in phase with the signal from said oscillator when the breathing appliance is occluded and when the breathing appliance is opened.

8. Apparatus for the measurement of the resistance and reactance of the lungs comprising:

an air driver including a diaphragm, a first coil for driving said diaphragm in an oscillating motion in response to an electrical signal applied thereto, an oscillator for driving said first coil at a frequency within the range of 5 to 50 cycles per second a breathing appliance pneumatically coupled to a chamber on one side of said diaphragm, a second coil mounted on said diaphragm and producing an electrical signal representing the actual motion of said diaphragm, a resistance detector for determining the magnitude of that portion of the electrical signal produced by said second coil which is in phase with the electrical signal applied to said first coil, and a reactance detector for determining the magnitude and polarity of that portion of the electrical signal produced by said second coil which is 90° out of phase with the electrical signal applied to said first coil.

9. The apparatus recited in claim 8 further comprising a recorder for displaying the output of said resistance detector relative to the output of said reactance detector to display the total impedance profile of the lungs.